United States Patent
Broderick et al.

(10) Patent No.: US 6,911,570 B2
(45) Date of Patent: Jun. 28, 2005

(54) METHOD FOR FIXATING SLUDGES AND SOILS CONTAMINATED WITH MERCURY AND OTHER HEAVY METALS

(75) Inventors: Thomas E. Broderick, Arvada, CO (US); Rachel L. Roth, Littleton, CO (US); Allan L. Carlson, Evergreen, CO (US)

(73) Assignee: ADA Technologies, Inc., Littleton, CO (US)

( * ) Notice: Subject to any disclaimer, the term of this patent is extended or adjusted under 35 U.S.C. 154(b) by 270 days.

(21) Appl. No.: 09/997,932

(22) Filed: Nov. 28, 2001

(65) Prior Publication Data

US 2002/0106317 A1 Aug. 8, 2002

Related U.S. Application Data

(60) Provisional application No. 60/253,482, filed on Nov. 28, 2000.

(51) Int. Cl.$^7$ ................................. A62D 3/00
(52) U.S. Cl. .................. 588/236; 588/231; 423/1; 423/48; 405/128.1; 405/128.15; 405/128.5; 405/125.55; 405/128.7; 405/128.75; 405/128.8
(58) Field of Search ............................. 588/231, 236; 423/1, 48, 53; 405/128.1, 128.15, 128.5, 128.55, 128.7, 128.75, 128.8

(56) References Cited

U.S. PATENT DOCUMENTS

| | | | |
|---|---|---|---|
| 1,697,095 A | 1/1929 | Turner | |
| 2,145,901 A | 2/1939 | Shoemaker | 210/23 |
| 2,367,496 A | 1/1945 | Greentree | 252/299 |
| 2,860,952 A | 11/1958 | Bergeron et al. | 23/134 |
| 3,194,629 A | 7/1965 | Dreibelbis et al. | 23/2 |
| 3,201,149 A | 8/1965 | Bragg | 285/39 |
| 3,232,033 A | 2/1966 | Williston et al. | 55/387 |
| 3,257,776 A | 6/1966 | Park et al. | 55/72 |
| 3,374,608 A | 3/1968 | Manes | 55/72 |
| 3,499,837 A | 3/1970 | Jaunarajs | 210/59 |

(Continued)

FOREIGN PATENT DOCUMENTS

| | | | |
|---|---|---|---|
| CA | 2173171 | 10/1996 | |
| CA | 2173271 | 2/1999 | |
| DE | 3813 264 A1 | 11/1988 | |
| DE | 3814684 A  * | 11/1989 | ............ A62D/3/00 |
| DE | 41 23907 A1 | 1/1993 | |
| DE | 44 22 468 A1 | 1/1996 | |
| JP | 48026672 A | 4/1973 | |
| JP | 51069483 | 6/1976 | |
| JP | 11147082 A  * | 6/1999 | ............ B09B/3/00 |
| WO | WO 02/096559 A1 | 5/2001 | |

OTHER PUBLICATIONS

Sittig, 1973, Pollutant Removal Handbook: 286–294.
Grant et al., 1987, Grant & Hackh's Chemical Dictionary: 25, 29.
Barth, 1990, The SITE Demonstration of the CHEMFIX Solidification/Stabilization Process at the Portable Equipment Salvage Company Site: 166–170.

(Continued)

*Primary Examiner*—Stuart L. Hendrickson
*Assistant Examiner*—Peter J Lish
(74) *Attorney, Agent, or Firm*—Sheridan Ross P.C.

(57) ABSTRACT

The invention relates to a method, composition and apparatus for stabilizing mercury and other heavy metals present in a particulate material such that the metals will not leach from the particulate material. The method generally involves the application of a metal reagent, a sulfur-containing compound, and the addition of oxygen to the particulate material, either through agitation, sparging or the addition of an oxygen-containing compound.

82 Claims, 1 Drawing Sheet

U.S. PATENT DOCUMENTS

| | | | |
|---|---|---|---|
| 3,516,947 A | 6/1970 | Dudzik | 252/439 |
| 3,576,947 A | 5/1971 | Kruger | 178/69.5 |
| 3,674,428 A | 7/1972 | Dean et al. | 23/134 |
| 3,677,696 A | 7/1972 | Bryk et al. | 23/2 |
| 3,740,331 A | 6/1973 | Anderson et al. | 210/53 |
| 3,749,761 A | 7/1973 | Dean et al. | 423/562 |
| 3,755,161 A | 8/1973 | Yokota et al. | 210/36 |
| 3,790,370 A | 2/1974 | Lalancette | 75/108 |
| 3,835,217 A | 9/1974 | Dunsmoor | 423/499 |
| 3,847,598 A | 11/1974 | Coulter et al. | 75/121 |
| 3,857,704 A | 12/1974 | Coulter | 75/121 |
| 3,864,327 A | 2/1975 | Marchant | 260/231 A |
| 3,873,581 A | 3/1975 | Fitzpatrick et al. | 260/370 |
| 3,876,451 A | 4/1975 | Zall | 117/62 |
| 3,890,225 A | 6/1975 | Kajiyama | 210/38 |
| 3,935,098 A | 1/1976 | Oda et al. | 210/38 |
| 3,947,354 A | 3/1976 | Swanson et al. | 210/53 |
| 3,948,863 A | 4/1976 | Akamatsu et al. | 260/78 A |
| 3,961,031 A | 6/1976 | Yasui et al. | 423/210 |
| 3,969,244 A | 7/1976 | Kobayashi et al. | 210/38 B |
| 3,984,606 A | 10/1976 | Morgan | 428/419 |
| 3,994,719 A | 11/1976 | Corte et al. | 75/101 BE |
| 3,999,825 A | 12/1976 | Cannon | 339/15 |
| 4,008,937 A | 2/1977 | Filippi | 339/15 |
| 4,038,071 A | 7/1977 | Di Bella | 75/108 |
| 4,051,316 A | 9/1977 | Wing et al. | 536/107 |
| 4,053,401 A | 10/1977 | Fukushima et al. | 210/52 |
| 4,069,140 A | 1/1978 | Wunderlich | 208/251 H |
| 4,072,605 A | 2/1978 | Thelander | 210/50 |
| 4,083,783 A | 4/1978 | Wing et al. | 210/54 |
| 4,087,359 A | 5/1978 | Patron et al. | 210/50 |
| 4,094,777 A | 6/1978 | Sugier et al. | 210/32 |
| 4,101,631 A | 7/1978 | Ambrosini et al. | 423/210 |
| 4,108,769 A | 8/1978 | Krieg et al. | 210/50 |
| 4,118,243 A | 10/1978 | Sandesara | 106/109 |
| 4,133,755 A | 1/1979 | Tarao et al. | 210/38 B |
| 4,147,626 A | 4/1979 | Findlay et al. | 210/52 |
| 4,151,077 A | 4/1979 | Nogueira et al. | 210/21 |
| 4,153,556 A | 5/1979 | Riedinger | 210/218 |
| 4,160,730 A | 7/1979 | Nguyen | 210/48 |
| 4,196,173 A | 4/1980 | deJong et al. | 423/210 |
| 4,230,486 A | 10/1980 | Capuano et al. | 75/81 |
| 4,233,274 A | 11/1980 | Allgulin | 423/210 |
| 4,238,329 A | 12/1980 | Zievers | 210/36 |
| 4,245,989 A | 1/1981 | Folkenroth et al. | 433/92 |
| 4,249,786 A | 2/1981 | Mahoff | 339/15 |
| 4,256,227 A | 3/1981 | Petrovich | 209/166 |
| 4,256,707 A | 3/1981 | Flynn, Jr. et al. | 423/42 |
| 4,260,494 A | 4/1981 | Dotson et al. | 210/721 |
| 4,273,747 A | 6/1981 | Rasmussen | 423/210 |
| 4,285,564 A | 8/1981 | Spinner | 339/89 C |
| 4,340,623 A | 7/1982 | Justus | 427/361 |
| 4,354,942 A | 10/1982 | Kaczur et al. | 210/712 |
| 4,363,749 A | 12/1982 | Weiss et al. | 252/455 R |
| 4,377,483 A | 3/1983 | Yamashita et al. | 210/670 |
| 4,385,891 A | 5/1983 | Ligotti | 433/92 |
| 4,419,107 A | 12/1983 | Roydhouse | 55/5 |
| 4,443,417 A | 4/1984 | Wiklund | 423/210 |
| 4,459,370 A | 7/1984 | van der Wal et al. | 502/338 |
| 4,474,896 A | 10/1984 | Chao | 502/216 |
| 4,500,327 A | 2/1985 | Nishino et al. | 55/72 |
| 4,564,374 A | 1/1986 | Hofmann | 55/57 |
| 4,583,999 A | 4/1986 | Lindahl et al. | 55/68 |
| 4,591,437 A | 5/1986 | Ernryd et al. | 210/265 |
| 4,599,177 A | 7/1986 | Hayashi et al. | 210/718 |
| 4,614,592 A | 9/1986 | Googin et al. | 210/679 |
| 4,654,322 A | 3/1987 | Holbein et al. | 502/403 |
| 4,670,160 A | 6/1987 | Moriya et al. | 210/728 |
| 4,693,731 A | 9/1987 | Tarakad et al. | 55/72 |
| 4,695,447 A | 9/1987 | Shultz | 423/659 |
| 4,709,118 A | 11/1987 | Yan | 585/820 |
| 4,721,582 A | 1/1988 | Nelson | 252/189 |
| 4,731,187 A | 3/1988 | Moriya et al. | 210/719 |
| 4,752,398 A | 6/1988 | Holbein et al. | 210/679 |
| 4,753,632 A | 6/1988 | Hofmann et al. | 494/43 |
| 4,764,219 A | 8/1988 | Yan | 134/2 |
| 4,764,355 A | 8/1988 | Romey et al. | 423/244 |
| 4,771,030 A | 9/1988 | Audeh | 502/414 |
| 4,786,483 A | 11/1988 | Audeh | 423/210 |
| 4,786,484 A | 11/1988 | Nelson | 423/239 |
| 4,814,091 A | 3/1989 | Napier et al. | 210/665 |
| 4,814,152 A | 3/1989 | Yan | 423/210 |
| 4,834,953 A | 5/1989 | Audeh | 423/210 |
| 4,843,102 A | 6/1989 | Horton | 521/28 |
| 4,844,815 A | 7/1989 | Ader et al. | 210/751 |
| 4,861,493 A | 8/1989 | Jansen | 210/715 |
| 4,877,515 A | 10/1989 | Audeh | 208/251 R |
| 4,892,567 A | 1/1990 | Yan | 55/33 |
| 4,902,662 A | 2/1990 | Toulboat et al. | 502/216 |
| 4,909,926 A | 3/1990 | Yan | 208/253 |
| 4,909,944 A | 3/1990 | Jackson et al. | 210/674 |
| 4,911,825 A | 3/1990 | Roussel et al. | 208/251 R |
| 4,915,818 A | 4/1990 | Yan | 208/251 |
| 4,917,862 A | 4/1990 | Kraw et al. | 423/4 |
| 4,919,826 A | 4/1990 | Alzner | 210/788 |
| 4,933,158 A | 6/1990 | Aritsuka et al. | 423/210 |
| 4,950,408 A | 8/1990 | Duisters et al. | 210/660 |
| 4,962,276 A | 10/1990 | Yan | 585/867 |
| 4,969,995 A | 11/1990 | Jackson et al. | 210/263 |
| 4,985,389 A | 1/1991 | Audeh | 502/516 |
| 4,986,898 A | 1/1991 | Torihata et al. | 208/251 |
| 5,017,135 A | 5/1991 | Meyer | 433/92 |
| 5,034,054 A | 7/1991 | Woodward | 75/388 |
| 5,053,209 A | 10/1991 | Yan | 423/210 |
| 5,062,948 A | 11/1991 | Kawazoe et al. | 208/251 |
| 5,064,626 A | 11/1991 | Johnson et al. | 423/245.1 |
| 5,080,799 A | 1/1992 | Yan | 210/661 |
| 5,085,844 A | 2/1992 | Nowack et al. | 423/245.1 |
| 5,107,060 A | 4/1992 | Yan | 585/823 |
| 5,114,578 A | 5/1992 | Sundstrom | 210/256 |
| 5,120,515 A | 6/1992 | Audeh et al. | 423/210 |
| 5,141,724 A | 8/1992 | Audeh et al. | 423/210 |
| 5,154,833 A | 10/1992 | Robinson | 210/664 |
| 5,173,286 A | 12/1992 | Audeh | 423/566.1 |
| 5,192,163 A | 3/1993 | Fleming | 405/128 |
| 5,202,301 A | 4/1993 | McNamara | 502/417 |
| 5,209,773 A | 5/1993 | Audhe et al. | 75/388 |
| 5,227,053 A | 7/1993 | Brym | 210/143 |
| 5,238,488 A | 8/1993 | Wilhelm | 75/742 |
| 5,245,106 A | 9/1993 | Cameron et al. | 585/823 |
| 5,248,488 A | 9/1993 | Yan | 423/210 |
| 5,294,417 A | 3/1994 | Moore et al. | 423/101 |
| 5,298,168 A | 3/1994 | Guess | 210/713 |
| 5,304,693 A | 4/1994 | Boitiaux et al. | 585/648 |
| 5,308,500 A | 5/1994 | Schwarzbach | 210/716 |
| 5,322,628 A | 6/1994 | Yan | 210/673 |
| 5,330,658 A | 7/1994 | Grant et al. | 210/717 |
| 5,336,835 A | 8/1994 | McNamara | 585/820 |
| 5,338,444 A | 8/1994 | van Buren et al. | 210/660 |
| 5,357,002 A | 10/1994 | Lezzi et al. | 525/332.2 |
| 5,360,632 A | 11/1994 | Johnson et al. | 427/212 |
| 5,369,072 A | 11/1994 | Benjamin et al. | 502/84 |
| 5,370,827 A | 12/1994 | Grant et al. | 588/18 |
| 5,391,217 A | 2/1995 | Zoche | 75/724 |
| 5,409,522 A | 4/1995 | Durham et al. | 75/670 |
| 5,419,884 A | 5/1995 | Weekman et al. | 423/210 |
| 5,421,994 A | 6/1995 | Sarrazin et al. | 208/251 R |
| 5,437,797 A | 8/1995 | Helmig | 210/669 |
| 5,460,643 A | 10/1995 | Hasenpusch et al. | 95/134 |
| 5,463,167 A | 10/1995 | Ou | 585/823 |
| 5,492,627 A | 2/1996 | Hagen et al. | 210/651 |

| | | | | |
|---|---|---|---|---|
| 5,505,925 | A | * | 4/1996 | Fristad .......................... 423/1 |
| 5,523,067 | A | | 6/1996 | Markovs ...................... 423/99 |
| 5,536,416 | A | | 7/1996 | Coltrinari et al. ........... 210/723 |
| 5,569,436 | A | | 10/1996 | Lerner ........................ 422/170 |
| 5,577,910 | A | | 11/1996 | Holland ........................ 433/92 |
| 5,599,515 | A | | 2/1997 | Misra et al. ................. 423/101 |
| 5,607,496 | A | | 3/1997 | Brooks ........................ 75/670 |
| 5,613,851 | A | | 3/1997 | Trawoger et al. ............. 433/92 |
| 5,658,487 | A | | 8/1997 | Carey et al. ................. 252/180 |
| 5,667,695 | A | | 9/1997 | Bedard et al. ............... 210/581 |
| 5,670,122 | A | | 9/1997 | Zamansky et al. .......... 423/210 |
| 5,679,259 | A | | 10/1997 | Bolser ........................ 210/719 |
| 5,695,726 | A | | 12/1997 | Lerner ........................ 423/210 |
| 5,741,397 | A | | 4/1998 | Kraver ........................ 159/25.2 |
| 5,753,125 | A | | 5/1998 | Kreisler ....................... 210/710 |
| 5,795,159 | A | | 8/1998 | Ralls et al. ................... 433/92 |
| 5,797,742 | A | | 8/1998 | Fraker .......................... 433/92 |
| 5,846,434 | A | | 12/1998 | Seaman et al. ............. 210/724 |
| 5,880,060 | A | | 3/1999 | Blake et al. ................. 502/411 |
| 5,885,076 | A | | 3/1999 | Ralls et al. ................... 433/92 |
| 5,895,832 | A | * | 4/1999 | Eccles ......................... 588/231 |
| 5,898,093 | A | | 4/1999 | Vos .............................. 588/236 |
| 5,900,042 | A | | 5/1999 | Mendelsohn et al. ......... 75/742 |
| 5,907,037 | A | | 5/1999 | Gujral et al. ................. 536/59 |
| 5,908,559 | A | | 6/1999 | Kreisler ....................... 210/710 |
| 5,919,001 | A | | 7/1999 | Lin ............................. 405/128 |
| 5,922,277 | A | | 7/1999 | Donhoff et al. ............... 422/1 |
| 5,967,965 | A | | 10/1999 | Vyshkina et al. ........... 588/256 |
| 5,976,270 | A | | 11/1999 | Zelez et al. .................. 134/28 |
| 5,976,383 | A | | 11/1999 | Guess et al. ................. 210/711 |
| 5,986,161 | A | | 11/1999 | Akae et al. .................. 588/231 |
| 6,022,216 | A | | 2/2000 | Cattani ......................... 433/92 |
| 6,024,239 | A | | 2/2000 | Turner et al. ................ 220/269 |
| 6,039,882 | A | * | 3/2000 | Wolfe et al. ................. 210/747 |
| 6,083,306 | A | | 7/2000 | Cattani ......................... 96/157 |
| 6,083,473 | A | | 7/2000 | Esquivel et al. ......... 423/576.8 |
| 6,103,205 | A | | 8/2000 | Wojtowicz et al. ......... 423/210 |
| 6,132,623 | A | | 10/2000 | Nikolaidis et al. .......... 210/719 |
| 6,139,485 | A | | 10/2000 | Pal et al. ..................... 588/256 |
| 6,139,751 | A | | 10/2000 | Bogaert et al. ............. 210/679 |
| 6,153,108 | A | | 11/2000 | Klock et al. ................. 210/722 |
| 6,165,366 | A | | 12/2000 | Sarangapani ................ 210/666 |
| 6,207,073 | B1 | * | 3/2001 | Wolfe et al. ................. 252/175 |
| 6,214,304 | B1 | | 4/2001 | Rosenthal et al. .......... 423/210 |
| 6,254,312 | B1 | * | 7/2001 | Chowdhury et al. ..... 405/128.5 |
| 6,270,679 | B1 | | 8/2001 | Kreisler ....................... 210/710 |
| 6,274,045 | B1 | | 8/2001 | Kreisler ....................... 210/710 |
| 6,284,208 | B1 | | 9/2001 | Thomassen ................. 423/210 |
| 6,294,139 | B1 | | 9/2001 | Vicard et al. ............... 423/210 |
| 6,322,613 | B1 | | 11/2001 | Wojtowicz et al. ........... 95/107 |
| 6,372,187 | B1 | | 4/2002 | Madden et al. ............. 422/171 |
| 6,375,909 | B1 | | 4/2002 | Dangtran et al. ........... 423/235 |
| 6,387,276 | B1 | | 5/2002 | Nikolaidis et al. .......... 210/719 |
| 6,403,044 | B1 | | 6/2002 | Litz et al. .................... 423/101 |
| 6,447,740 | B1 | | 9/2002 | Caldwell et al. ............ 423/210 |
| 6,524,371 | B2 | | 2/2003 | El-Shoubary et al. ......... 95/134 |
| 6,533,842 | B1 | | 3/2003 | Maes et al. .................... 95/134 |
| 6,534,024 | B2 | | 3/2003 | Honjo et al. ................ 423/210 |
| 6,558,642 | B2 | | 5/2003 | El-Shoubary et al. .... 423/245.3 |
| 2001/0007647 | A1 | | 7/2001 | Honjo et al. ................ 423/210 |
| 2003/0099585 | A1 | | 5/2003 | Allgulin ....................... 423/210 |

OTHER PUBLICATIONS

Huang et al., 1991, Emissions of Airborne Toxics from Coal–Fired Boilers: Mercury: 13–16.
Superfund Innovative Technology Evaluation, 1992.
Trezek, 1992, Remediation of Heavy Metals In Soils and Sludges: 1–5.
Darnell et al., 1992, Full–Scale Tests of Sulfur Polymer Cement and Non–radioactive Waste in Heated and Unheated Prototypical Containers: iii–A–8.
Blumbach et al., 1992, Sorbalit—A New Economic Approach Reducing Mercury and Dioxin Emissions: 2–20.
Hartenstein, 1992, A Fixed Bed Activated Coke/Carbon Filter as a Final Gas Cleaning Stage Retrofitted for a Hazardous Waste Incineration Plant—The First 6 Months of Operating Experience: 2–16.
Gorin et al., 1994, Final Disposal Options for Mercury/Uranium Mixed Wastes From the Oak Ridge Reservation: iii–21.
Daryl R., 1998, ADA Technologies, Inc. Memorandum.
1998, ADA Process for Stabilizing Radioactively Contaminated Elemental Mercury a Success, VIII (3): 1–4.
Brown, 2000, Stabilization of Mercury Containing Wastes.
2000, Soil Screening Guidance for Radionuclides: User's Guide: i–C–8.
Davis et al., Mercury Mixed Waste Treatment: 13–23.
Stewart et al., Stabilization of Radioactively Contaminated Elemental Mercury Wastes.
Darco FGD Activated Carbon for Removal of Mercury and Dioxin From Flue Gas: 1–5.
Conley, Hg Working Grioup/Treatment Demonstrations [3PCK]: 1–4.
Broderick et al., Mercury Control and Treatment Processes for Solid, Liquid and Gas Streams.
Tyson, 1992, Treatability Study for the Amalgamation of a Radioactively Contaminated Elemental Mercury Waste at the Idaho National Engineering Laboratory.
Faulkner et al., Size Reduction: 132–162.
Presentation to Idaho National Engineering and Environmental Laboratory, Aug. 12, 1997.
Stewart et al., "Stabilization of Radioactively Contaminated Elemental Mercury Wastes", DOE Spectrum 1998 Conference.
Jan. 20, 2003 print–out of E–watertechnologies' website at http://www.e–watertechnologies.com. regarding Whole House Anion Water Conditioner, 2 pages.
Jan. 20, 2003 print–out of E–watertechnologies' website at http://www.e–watertechnologies.com regarding Whole House Reverse Osmosis System, 4 pages.
Jan. 20, 2003 print–out of Wholly Water® website at http://www.wholly–water.com regarding The Ultimate Drinking Water Purification System, 9 pages.
Jan. 20, 2003 print–out of Prostar Mechanical Technologies Ltd. website at http://www.prostar–mechanical.com regarding Water Purification Systems and Equipment, 4 pages.
Jan. 20, 2003 print–out of Al Ultra Pure Drinking Water's website at http://www.alultrapure.com/drink.html regarding Drinking Water Systems, 8 pages.
Jan. 21, 2003 print–out of Apyron Technologies' website at http://www.apyron.com/home.html beginning with home page and including The Complete Arsenic Treatment Solution, 15 pages.
Jan. 20, 2003 print–out of USFilter website at http://www.usfilter.com/water regarding GFH™ Granular Ferric Hydroxide Media, 2 pages.
Jan. 20, 2003 print–out of Severn Trent Services at http://www.severntrentservices.com regarding SORB33, 2 pages.
Jan. 20, 2003 print–out of ADI website at http://www.adi.ca regarding Arsenic Removal, 1 page.
Jan. 20, 2003 print–out of TRAMFLOC, Inc. website at http://www.tramfloc.com regarding Application of Acti-Guard AAFS50 to Arsenic Removal, 3 pages.

Jan. 20, 2003 print–out of Waste Technolgoies of Australia Pty. Ltd. (Arsenic Solutions Information Page, Solutions and Resources) at http://www.arsenic–solutions.com regarding Simple Arsenic Removal Process (site under reconstruction), 2 pages.
Jan. 20, 2003 print–out of WRT website at http://wrtnet.com regarding The Z–33™ Arsenic Removal Process, 1 page.
Agion Antimicrobial, Agion Technologies LLC., The Most Advanced Antimicrobial Silver Delivery System, An Introduction, 10 page.
Bayer Corporation, Plastics Division, "Wheel Covers, Center Caps Become Revolving Art Forms With New Film Insert Molding Technology," 4 pages.
Brown, et al; "Mercury Measurement and Its Control: What We Know, Have Learned, and Need to Further Investigate;" J. Air & Water Manage. Assoc., pp. 1–97; Jun. 1999.
Gash, et al; "Efficient Recovery of Elemental Mercury from Hg(II)–Contaminated Aqueous Media Using a Redox–Recyclable Ion–Exchange Material;" Environ. Sci. Technol. 1988, 32, 1007–1012.
Dorhout and Strauss; "The Design, Synthesis, and Characterization of Redox–Recyclable Materials for Efficient Extraction of Heavy Element Ions form Aqueous Waste Streams;" 1999 American Chemical Society, pp. 53–68.
Rose, Arthur W., Hawkes, Herbert E., Webb, John S., "Geochemistry in Mineral Exploration," Second Edition, 1979, 3 pgs.
Maximum Separation Systems brochure, 7 pgs.
Maximum Product Information brochure, printed Apr. 14, 2000 from website http://www.amalgamseparators.com, 3 pgs.
Apr. 14, 2000 printout of ISOSEP® found at website http://www.drs.nl, 2 pgs.
Maximum Separation Systems, Inc. Model 2000 Type 4 Amalgam Separator brochure, 1 pg.
Metasys brochure, 2 pgs.
ADA Technologies, Inc. Final Progress Report Entitled "Cleanup of Dental Amalgam Waste to Meet Sewer Discharge Regulations;" Grant No. 1 R43 ES07886–01, Apr. 28, 1997, 43 PGS.
Bindsley; "Dental Office Waste Stream Characterization Study;" Municipality of Metropolitan Seattle, Royal Dental College, Adv. Dent. Res. 6:125–130, Sep. 1991, 60 pgs.
Bill Johnson; Technical Memorandum on "Mercury Source Identification Update: Dental Offices,and Human Waste;" EIP Associates; Mar. 2, 1999, 25 pgs.

"Scientific Review of Issues Impacting Dentistry;" Naval Dental Research Institute; vol. 2, No. 1, Jan. 2000, 5 pgs.
Pederson et al.; "The Removal of Mercury from Dental–Operatory Wastewater by Polymer Treatment;" Naval Dental Research Institute, Environmental Health Perspectives vol. 107, No. Jan. 1, 1999, 6 pgs.
Kümmerer et al.; "Mercury Emissions from Dental Chairs by Disinfection;" Institute of Environmental Medicine and Hospital Epidemiology, University Hospital Freiburg, *Chemosphere*, vol. 35, No. 4, pps. 827–833, 1997.
Fan et al.; "Environmental issues in dentistry—mercury*;" International Dental Journal (1997)47, 105–109. *Project Initiated and report approved by FDI Commission.
"Best Management Practices for Dental Waste;" City of Boulder Public Works/Utilities; 9 pgs.
Batchu et al., "Comparison of Particle Size Distributions of Dental Wastewater Under Various Clinical Procedures;" Naval Dental Research Institute Great Lakes, Illinois, 19 pgs.
Cailas et al., "Physico–chemical Properties of Dental Wastewater;" Water Environmental Federation, Chicago, Illinois, Oct. 1994, 11 pgs.
Arenholt–Bindsley and Larsen; "Mercury Levels and Discharge in Waste Water from Dental Clinics;" Waste, Air and Soil Pollution; 86:93–99, Jan. 1996, 8 pgs.
Letzel et al.; "An Estimation of the Size Distribution of Amalgam Particles in Dental Treatment Waste;" J. Dent.Res. 76(3):780–788; Mar. 1997.
Listing of Abstracts from Int'l Conference "Arsenic in Bangladesh Ground Water: World's Greatest Arsenic Calamity," Feb. 22–28, 1999, 22 pgs.
EPA "Arsenic in Drinking Water: Treatment Technologies for Arsenic Decision Tree, Variances and Exemptions," Jun. 2–3, 1999, 9 pages.
Driehaus, et al., "Granular ferric hydroxide—a new absorbent for the removal of arsenic from natural water," J. Water SRT—Aqua 47, 1998, abstract and pp. 59–68.
Murcott, Susan, Appropriate Remediation Technologies for Arsenic–Contaminated Wells, Massachusetts Institute of Technology, "Arsenic in Bangladesh Ground Water" Wagner College, Staten Island, New York, Feb. 27–28, 1999, 13 pgs.
ADA Technologies, Inc., "Turnkey Arsenic Removal for Small Water Systems," Topic #AFO3–265, Proposal #F031–0720, 3 pgs.

* cited by examiner

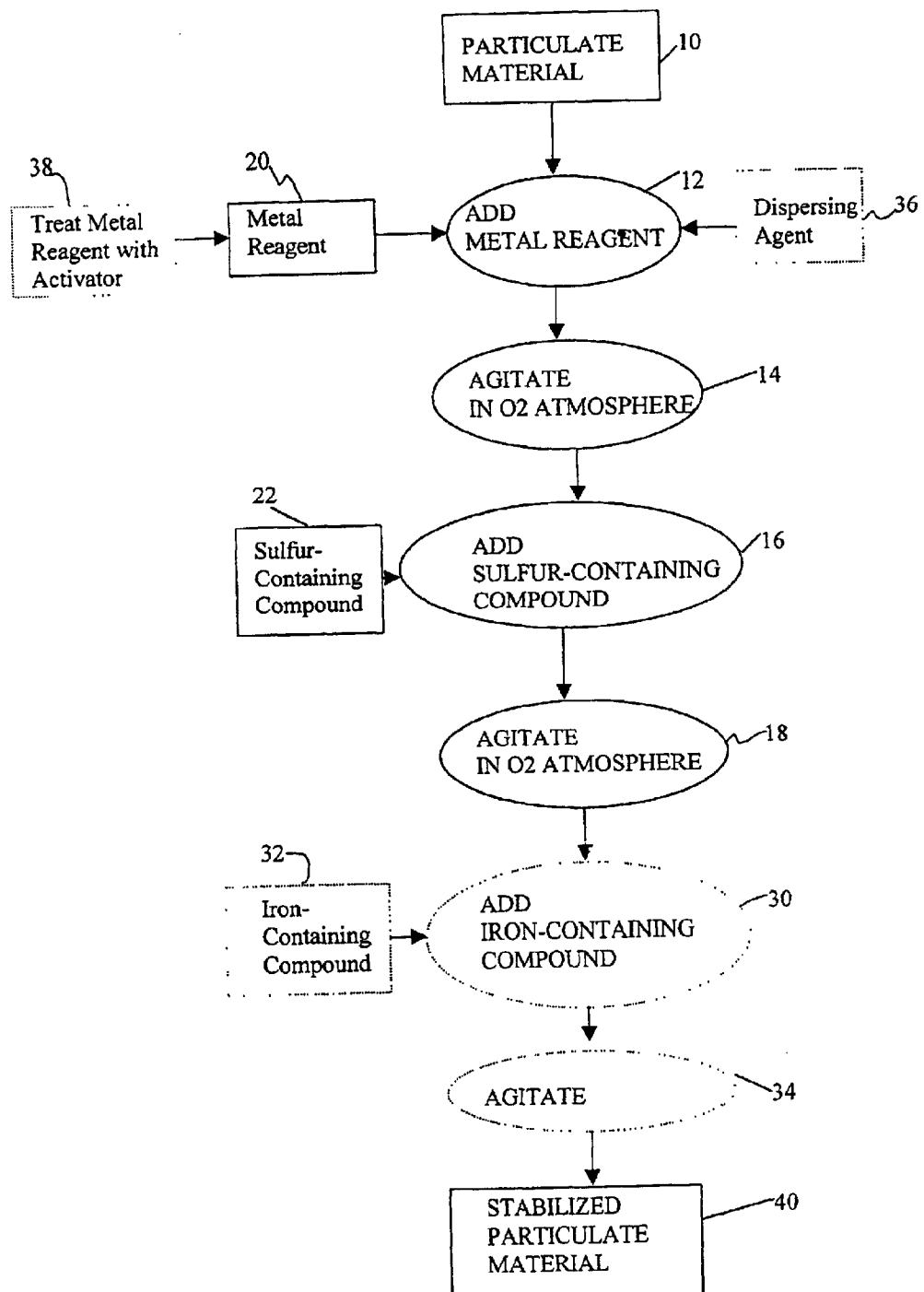
FIGURE

METHOD FOR FIXATING SLUDGES AND SOILS CONTAMINATED WITH MERCURY AND OTHER HEAVY METALS

CROSS REFERENCE TO RELATED APPLICATIONS

This application is related to and claims priority, under 35 U.S.C. § 119(e) from U.S. Provisional Patent Application Ser. No. 60/253,482, entitled "Method for Fixating Sludges and Soils Contaminated with Mercury and Other Heavy Metals", filed Nov. 28, 2000, the entirety of which is incorporated herein.

STATEMENT OF GOVERNMENT INTEREST

This invention was made with Government support under Contract No. DE-FG03-97-ER82722 awarded by the U.S. Department of Energy. The Government has certain rights in the invention.

FIELD OF THE INVENTION

This application is directed generally to techniques for stabilizing mercury and other heavy metals and specifically to techniques for stabilizing mercury and other heavy metals that are dispersed throughout a particulate material.

BACKGROUND OF THE INVENTION

A serious environmental problem worldwide is the contamination of particulate materials, such as soils, sediments, fly ash, carbon and sludges, with toxic substances and/or radioactive substances, particularly from industrial applications. It is not uncommon to find particulate materials that are contaminated with numerous heavy metals and are also radioactively contaminated with radionuclides. There are known health risks to the public and to the environment that are associated with various heavy metals, including but not limited to mercury.

A thermal retort system, followed by stabilization of the recovered mercury, is the U.S. Environmental Protection Agency's Best Demonstrable Available Technology for treating contaminated particulate materials having greater than 260 ppm of mercury. A thermal retort system is typically comprised of a vacuum heating unit and distillation/condensation systems to recover metallic mercury from salts, solid objects, soils and coproducts from other facility processes. An example of a thermal retort system is shown in U.S. Environmental Protection Agency Demonstration Bulletin, EPA/540/MR-02/078, November 1992, which is incorporated by reference herein. These devices produce a semi-pure metallic mercury liquid which is resold directly or sent to a triple distillation process for further purification. The triple distillation process uses a vacuum distillation system to remove traces of impurities from metallic mercury so it can be resold as pure "technical grade" mercury. In cases where radioactive contaminated solids are treated, recovered mercury must be amalgamated prior to disposal as described in 40 C.F.R. § 268.42 Table 1. Thermal retorts, though effective, have drawbacks, namely a low throughput of waste handling capacity, a high capital and operating cost, and the potential for harmful off gases which must also be treated. Given that the mercury is heated to vaporization and then condensed, the possibility for mercury to escape or emit in an off gas from a thermal retort process is high.

Due to the high costs and emission problems associated with thermal retorts, other non-thermal (chemical) techniques have been attempted, with varying degrees of success, for stabilizing mercury and other heavy metals in particulate materials. For example, powdered zinc has been used to collect liquid elemental mercury in soils. Once the mercury is collected on the metal, liquid sulfur (polysulfide) is used to react with the mercury to form mercuric sulfide. However, zinc is an environmentally regulated metal as it maybe leached from the waste during the Toxic Characteristic Leaching Procedure (TCLP). Moreover, the prior art is focused on stabilizing mercury in aqueous waste streams. These treatments do not address the treatment of particulate materials contaminated with mercury, and may not be effective in treating particulate materials for many reasons. For example, the difference in the properties of an aqueous stream are vastly different from those of a solid or particulate material.

Another chemical method used to stabilize liquid elemental mercury was described in U.S. patent application Ser. No. 09/258,659 (about to issue) for stabilizing waste liquid elemental mercury, incorporated by reference herein. In this method, a combination of powdered sulfur and liquid sulfur (polysulfide) were used to react with the elemental mercury to form black mercuric sulfide (meta-cinnabar). However, merely placing elemental mercury in a bed of sulfur or in a volume of polysulfide does not yield the desired mercuric sulfide reaction. Sufficient heat must be available to overcome the energy of activation for the reaction to occur. In this method, intense mixing provided the necessary energy to initiate the reaction. Sufficient heat was generated from the reaction to escalate the rate at which mercuric sulfide was formed. In some instances, it was necessary to add water to the mixture in order to cool the reactants and control the reaction.

Attempts to use chemical methods on soils and sludges spiked with elemental mercury have largely been unsuccessful. These methods were generally ineffective in stabilizing mercury for two reasons. First, heat provided by mixing action or generated from the mercury-sulfur reaction quickly dissipates throughout the surrounding matrix materials, so it is difficult to overcome the energy of activation and initiate the mercury-sulfur reaction not just locally but throughout the entire reaction mass. Second, mercury in soils is not a continuous phase, as is the case when treating liquid elemental mercury. Chemical stabilization of mercury and other heavy metals in solid materials is difficult because of the dispersed nature of the contaminant within the solid matrix and the consequent problem of contacting a stabilizing chemical additive(s) with such a widely dispersed contaminant. Distance between the reaction sites is great enough to prevent the reaction from propagating from one site to another.

SUMMARY OF THE INVENTION

The technology described in this invention was developed for the purpose of stabilizing, mercury compounds and other heavy metals in solid wastes and soils. The technology is particularly effective in treating those wastes contaminated with more than about 260 parts per million (ppm) mercury as well as contaminated with other heavy metals such as arsenic, barium cadmium, chromium, lead, selenium, and silver. The present invention can solve the problems of the earlier methodologies for attempting to stabilize mercury and other heavy metals that are present in particulate materials. The present invention can provide a way to stabilize at least most, if not all, of the mercury or heavy metals, even if those metals are dispersed throughout the particulate material. The invention can directly stabilize the mercury-contaminated waste and is a feasible technical alternative to thermal retort. The invention may also be available as a regulatory alternative to thermal retort. Besides being easier and more cost-effective, the approach is more technically sound for many wastes, especially those that are co-contaminated with heavy metals and radionuclides. Radionuclides are those radioactive elements or compounds with a half-life of greater than six months. Examples of such radionuclides include but are not limited to various isotopes of cesium, strontium, uranium, plutonium, sodium, nickel, iron, iodine and potassium. A fairly comprehensive list of radionuclides is found in Appendix C of the EPA's Soil Screening Guidance for Radionuclides: User's Guide, published October 2000, which is incorporated herein in its entirety by reference. A major advantage to the present invention is the lower risk of fugitive emissions which are typically associated with thermal treatments.

While not wishing to bound by any theory, in one embodiment, the present invention provides a method of stabilizing mercury and other heavy metals in a particulate material comprising, sequentially or simultaneously, contacting a metal reagent with the particulate material to amalgamate with the mercury present in the particulate material, contacting a sulfur-containing compound with the particulate material to form an insoluble metal sulfide and agitating the various additives and the particulate material to entrain oxygen in the particulate material in order to assist the sulfur-containing compound to form the insoluble metal sulfide. The metal reagent is preferably any metal from Groups 1B, 2B, 4B and 4A of the Periodic Table of Elements. The sulfur-containing compound is preferably any sulfur-containing compound that will disassociate enough in the particulate material to allow the sulfur to participate in chemical reactions to form an insoluble metal sulfide.

The invention can be modified in a number of ways. For example, a dispersing agent can be contacted with the particulate material to emulsify oils associated with the particulate material. The dispersing agent is preferably any surfactant or detergent. As a second example of a modification to the invention, an activator can be also contacted with the metal reagent, typically before the metal reagent is added to the particulate material, to remove any oxides that may have formed on the surface of the metal reagent. The activator is preferably a mineral acid or salt thereof. Thirdly, an iron-containing compound can be contacted with the particulate material to react with any excess sulfides that may remain in the particulate material following the addition of the sulfur-containing compound. The iron-containing compound is preferably any compound with iron that will disassociate enough in the particulate material to allow the iron to bind with the excess sulfides. The particulate material can also be impregnated with gaseous oxygen, as an alternative to or in addition to, agitating the particulate material in an oxygen-containing atmosphere to enhance the reactions occurring in the particulate material. In addition to or alternatively to admixing the particulate material in an oxygen-containing atmosphere, an oxygen-containing compound can be applied to the particulate material to provide the oxygen needed for the reactions to occur. The oxygen-containing compound is preferably any compound with oxygen that will disassociate enough in the particulate material to allow the oxygen to participate in the reactions between the mercury, the heavy metals and the sulfides.

The invention also comprises a composition that can be used to stabilize mercury and other heavy metals in the particulate material that includes one or more of the additives noted above. For example, the composition can include the metal reagent, the sulfur-containing compound, and/or the oxygen-containing compound. The composition can further include an iron-containing compound. The present invention also comprises a composition of the resultant stabilized material that will follow from the implementation of the method of the invention. The present invention also describes an apparatus that allows the method of the invention to be implemented. These and other objects, features, and advantages of the invention will become apparent from the following best mode description, the drawings and the claims.

BRIEF DESCRIPTION OF THE DRAWINGS

The FIGURE which follows depicts an embodiment of the invention, and may depict various alternative embodiments. The invention is not limited to the embodiment or embodiments depicted herein since even further various alternative embodiments will be readily apparent to those skilled in the art.

The FIGURE is a flowchart of one of the embodiments of the present invention.

DETAILED DESCRIPTION OF THE INVENTION

At the outset, it should be understood that this invention comprises a method of stabilizing mercury and other heavy metals in a particulate material. The description which follows describes various embodiments of the invention, and various alternative embodiments. It should be readily apparent to those skilled in the art, however, that various other alternative embodiments may be accomplished without departing from the spirit or scope of the invention.

The present invention generally describes a method of stabilizing mercury and other heavy metals in a particulate material. The particulate material is preferably one or more of a number of different materials including but not limited to soils, dirt, sludges, solid wastes, sands, or any material with a solids content greater than about fifty weight percent and, more preferably, greater than about eighty weight percent and/or a liquid content of no more than about fifty weight percent and more preferably of not more than about twenty weight percent.

The particulate material typically includes mercury and/or other heavy metals, either as elements or compounds with other substances, and radionuclides. The particulate material will generally have more than 260 ppm mercury, since below that level no treatment is regulated, under current regulations. Generally, the particulate material contains no more than about 100,000 ppm mercury; more than about 5,000 ppm heavy metals and even more generally from about 300 to 1,000 ppm heavy metals (other than mercury). The amount of radionuclides present in the particulate material does not affect the method of the invention.

Embodiments of the method of the present invention are shown in the FIGURE. It should be understood by one of ordinary skill in the art that the compounds, other than the iron containing compound, to be added to the particulate material, as described below, can be added either separately or simultaneously. The iron containing compound should be added as a final step to bind any excess sulfides that may be remaining from the previous reactions.

The reactions described below are usually conducted at ambient temperatures, approximately 65 to 85 degrees Fahrenheit. However, one of ordinary skill in the art will understand that temperature can influence the reactions between the contaminants in the particulate material and the various stabilizing additives described below. The effect of temperature on the reactions is discussed herein.

Metal Reagent

As shown in the FIGURE, the metal reagent 20 is added, in step 12, to the particulate material 10 and admixed or agitated 14 for a period of time. The temperature of the particulate material will influence the reaction time and the mixing time by enhancing the reactions between the various components of the particulate material. In an embodiment, this period of time can range from a few minutes to a few hours, dependent on the size and amount of the material to be admixed. In an embodiment, for a 1 kilogram batch, the mixing time following the addition of the metal regent is approximately one hour. The metal reagent has, at this point, reacted with the dispersed mercury and other heavy metals in the particulate material.

While not wishing to be bound by any theory, it is believed that the ionic mercury reaction is an amalgamation reaction according to the following equations:

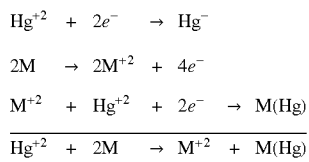

where M is a divalent metal. It is also believed that the elemental mercury reactions are as follows:

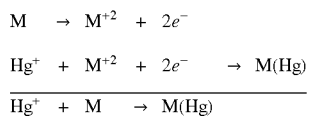

again, where M is a divalent metal.

Metal Reagent Description

The metal reagent 20 can be any form of an elemental metal chosen from Groups 1B, 2B, 4B, and 4A in the Periodic Table of Elements. In one embodiment, the metal reagent is an elemental form of zinc, tin, copper, titanium, lead, or mixtures thereof. It is also believed that compounds of these various forms are suitable for use in the invention; however, the compounds must disassociate enough to allow the metal to amalgamate with the mercury. Thus, suitable compounds may include but are not limited to tin chloride, zinc sulfate, or copper sulfate. Even though these metals will amalgamate or form a compound with mercury, it should be noted that the amounts of most of these metals that can be present in particulate materials is regulated by the Resource Conservation and Recovery Act (RCRA). Thus, in one embodiment, the metal reagent is preferably tin, since tin is one of the few metals that will amalgamate with mercury that is not regulated under RCRA.

Amount of Metal Reagent

The amount of metal reagent to be added to the particulate material is based on the amount of particulate material to be treated and the mercury content of the material. In one embodiment of the method of the present invention, the amount of metal reagent to be added is in the range of approximately 0.4 weight percent to approximately 2.0 weight percent of the particulate material. In another embodiment, the amount of metal reagent added to the particulate range is approximately 0.6 weight percent of the particulate material. As an example, for a 1 kilogram batch of the particulate material to be treated, between about 4 grams of metal reagent to 20 grams of metal reagent is added to the particulate material batch.

Mixing of the Particulate Material

The mixing of the particulate material with the sulfur-containing compound and the metal reagent in a molecular oxygen-containing atmosphere, in addition to entraining oxygen in the particulate material, allows the distribution of the reagent and the sulfur-containing compound throughout the particulate material, thus permitting the metal reagent and sulfur-containing compound to reach more of the dispersed mercury and other heavy metals. The oxygen-containing atmosphere should contain at least 21 volume percent of gaseous oxygen and more preferably contains from about 20 to about 100 volume percent gaseous oxygen. It should be noted, however, the use of oxygen at the higher volume percent described herein should be carefully monitored to ensure that the oxygen does not oxidize the sulfur-containing compounds to sulfates and render them unsuitable for use in the reactions described herein. In addition, use of oxygen at the higher volume percentages may not be financially feasible, although it may be technically feasible.

The mixing of the particulate material should be fairly vigorous in order to lessen the amount of time that the mixture should be agitated. It should be understood by one of skill in the art that as the vigor of the mixing decreases, the time that the material should be mixed increases. Thus, to accomplish the reactions in a preferred amount of time, the material should be mixed at various speeds and intensity. In one embodiment, the mixture is agitated for approximately an hour following the addition of the metal reagent. In this same embodiment, the sulfur-containing compound is then added to the mixture and the mixture is agitated for approximately two hours. The agitation, in this embodiment, that occurs is such that the material is at least being turned over. An agitation index of 0 means that there is no perceptible stirring or movement with the mixture, whereas an agitation index of 10 means the mixture is stirred at a very high and rapid degree of mixing and agitation. Table I shows the qualitative characteristics of the 0–10 agitation index. This Table I has also appeared in U.S. Pat. No. 6,284,005.

TABLE I

Agitation Index

| Agitation Index | Description |
|---|---|
| 1 | static, no movement or mixing |
| 2 | |
| 3 | turnover of sludge, but not all solids held in suspension |
| 4 | |
| 5 | mild turnover of sludge with all solids held in suspension |
| 6 | |
| 7 | rolling surface with quick turnover and quick absorption of dry material into mass of slurry |
| 8 | |
| 9 | violent turbulent movement of all slurry in entire vessel |
| 10 | degradation or mechanical fracturing of material |

Thus, the mixture is preferably agitated at an agitation index of at least 5 and, more preferably, agitated at a level of about 5 to about 9.

Sulfur-Containing Compound

Following the mixing of the particulate material and the metal reagent in step 14, as shown in the embodiment demonstrated by the FIGURE, the sulfur-containing compound 22 is added, in step 16, to the particulate material. The sulfur-containing compound, the amalgamated metal/mercury complex, and the particulate material are admixed or agitated, in step 18, for a period of time. The mixture is preferably agitated at an agitation index of at least 5 and, more preferably, agitated at a level of about 5 to about 9. The temperature of the particulate material will influence the reaction time and the mixing time by enhancing the reactions. In one embodiment, this period of time can range from a few minutes to a few hours, dependent on the size and amount of the material to be admixed. In another embodiment of the method of the present invention, for a 1 kilogram batch, the sulfur-containing compound is admixed in an oxygen-containing atmosphere with the particulate material and the amalgamated metal/mercury complex for approximately two hours. At the end of the period of time, an insoluble metal sulfide has formed and the mercury and other heavy metals are stabilized and will not leach from the particulate material.

Form and Amount of the Sulfur-Containing Compound

The sulfur-containing compound can be any sulfur-containing compound. In one embodiment, the sulfur-containing compound is sulfide or polysulfide. A sulfide is sulfur with a negative 2 state. Polysulfides are generally defined as many sulfides chemically bound together. In addition, other sulfur-containing compounds such as hydrogen sulfide, dimethylthiolcarbamate, diethylthiolcarbamate sodium sulfide, or sodium thiosulfate, can be used. In one embodiment, the sulfur-containing compound is calcium polysulfide. The amount of polysulfide to be added to the amalgamated metal/mercury complex or complexes that have formed as a result of the addition of the metal reagent to the particulate material is dependent on the amount of mercury that is present in the particulate material. The relationship between the amount of mercury present and the amount of polysulfide to be added is typically not a direct ratio. In one embodiment, the amount of polysulfide to be added is in a range of approximately 1.0 mole to approximately 2.0 moles per mol of mercury for a metals concentration in the range of about 300 ppm to about 1000 ppm, whereas the amount of polysulfide is in a range of approximately 2.0 moles to approximately 3.0 moles per mol of mercury for a metals concentration in the range of about 1000 ppm to about 5000 ppm. In another embodiment, the amount of polysulfide to be added, for an average mercury concentration of about 17000 ppm, is 2.5 mole per mole of mercury while, for an average mercury concentration of about 5000 ppm, 1.7 moles of polysulfide per mol of mercury should be added.

In an alternate embodiment of the invention, excess sodium diethylthiolcarbamate, or another complexing agent, is added to the mixture in the event that some mercury becomes disassociated at some future point. The mercury could become disassociated from the sulfide if the material was stored in a highly acidic or basic environment. Having excess complexing agent in the material will bind the mercury before the mercury can leach from the material.

Excess Sulfides and the Iron-Containing Compound

Often, excess unreacted sulfides or polysulfides will remain in the particulate material once the insoluble metal sulfide has formed. Since sulfides are often regulated by many environmental regulations, the excess sulfides may need to be reacted with reactive metal(s) in the particulate material. Thus, the invention can further be modified by adding an iron-containing compound 32 to the particulate material 10 wherein the iron-containing compound will react with any excess sulfides that may have formed in the particulate material from the particulate material by binding to the excess sulfides to create an insoluble iron sulfide. The iron-containing compound should be admixed with the various additives described above and the particulate materials. The mixture is preferably agitated, in step 34, at an agitation index of at least 5 and, more preferably, agitated at a level of about 5 to about 9. The temperature of the particulate material will influence the reactions by enhancing the reaction.

Form and Amount of the Iron-Containing Compound

The iron-containing compound can be any compound that will allow iron to disassociate and bind with any excess sulfides that may be present in the particulate material to form an insoluble ferric sulfide. In one embodiment, the iron-containing compound can be elemental iron, ferric sulfate, ferric chloride, ferrous sulfate, or any compound that behave similarly to those listed. In another embodiment, the iron-containing compound is preferably ferric sulfate. The amount of iron-containing compound to be added to the particulate material is dependent on the pH of the treatment slurry (the particulate material plus the various additives to this point). In one embodiment, the amount of iron-containing compound is in the range of approximately 25 grams of 10 percent ferric chloride per kilogram of particulate material. In another embodiment, the amount of iron-containing compound is about 125 grams of 5 percent ferric chloride per 20 kilograms of particulate material.

Chemical Reactions Occurring and pH Level of the Particulate Material

Although the inventors do not wish to be tied to any one theory of the chemical reactions which are occurring the particulate material due to the additions of the various compounds described above, the following reactions are believed to be occurring in the stabilization of the mercury:

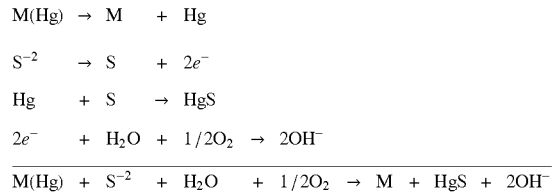

where the M is a divalent metal. It is also believed that the excess sulfide reactions are as follows:

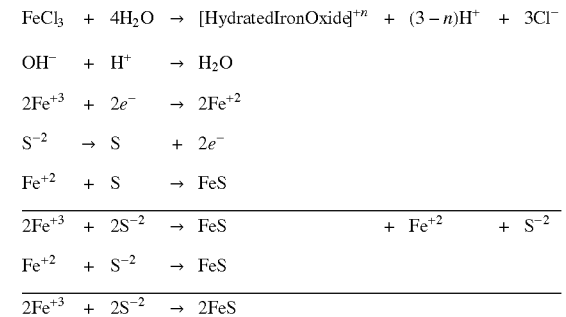

Due to the additions of these various compounds and additives, the pH level of the particulate material changes throughout the various additions that are made to the particulate material according to the method of the invention. The pH level of the particulate materials, at the beginning of the process, is typically in a range of about 4.0 to about 8.0. Following the addition of the metal reagent, the pH level of the particulate material maintains approximately the same pH of about 4 to about 8. Following the addition of the sulfur-containing compound, the pH level of the particulate material typically increases to the range of about 8 to about 11. The iron-containing compound is added until the pH level of the particulate material reverts to approximately a neutral level. An acid/base can be added to the particulate material once the above additions have been made to allow the particulate material to approach a neutral level.

Impregnation of the Particulate Material with Oxygen

The above invention can be modified to include impregnating the particulate material with gaseous or liquid oxygen, as an alternative to or addition to, agitating the particulate material in an oxygen-containing atmosphere. The ways in which oxygen is impregnated into the particulate material are many, well known to one of ordinary skill in the art and contemplated by the present invention. In one embodiment, if the particulate material is being treated in a mixer, the oxygen is impregnated into the particulate material through a sparge line which will pump oxygen directly into the particulate material while the particulate material is being agitated.

Dispersing Agent

Under the principles of the present invention, one embodiment of the invention includes adding a dispersing agent 36 to the particulate material to emulsify any oils, such as diesel oils or PCBs, that may be present. In one embodiment, the dispersing agent is a surfactant or detergent. In another embodiment of the invention using the dispersing agent, the dispersing agent can be any industrial strength surfactant. The purpose of the addition of the dispersing agent is to neutralize an oils that may be present in the contaminated particulate material. The amount of the dispersing agent to be added is dependent on the amount of oils present in the particulate material. As an example, for a 1 kilogram batch of particulate material having 100 ppm of oils, 1.5 grams of dispersing agent should be added.

Activator

The invention can also be modified by treating the metal reagent with an activator 38 before adding the metal reagent to the particulate material as described above. While not wishing to be bound to any theory, it is believed that the activator cleans the surface of the metal reagent by removing metal oxide compounds that may accumulate on the surface of such compounds. The inventors have noticed that the metal reagent appears to be more reactive when treated with an activator prior to being admixed with the contaminated particulate material. The activator contemplated by the present invention can be any compound that will perform the function of removing oxidation from the metal reagent. In one embodiment, the activator is a mineral acid or salt thereof. In another embodiment, the activator can be sulfamic acid, sulfamidic acid, sulfonic acid, sulfinic acid, or sulfenic acid or any compounds that behave similarly to those listed. In a further embodiment, the activator is preferably sulfamic acid. The amount of activator to be used is preferably just enough to remove the oxidation on the metal reagent without destroying the metal reagent. The amount of activator for treating a gram of metal reagent is preferably in the range of about 0.1 grams of activator per gram of metal to 0.3 grams of activator per gram of metal. More preferably, the amount of activator for treating a gram of metal reagent is about 0.3 grams of activator to gram of metal.

The effectiveness of the invention is demonstrated by the following examples. However, it should be understood that the following examples do not define the scope of the invention; they are presented merely to demonstrate the effectiveness of the invention.

EXAMPLE 1

The present invention was demonstrated by testing seven soil samples taken from a mixed (radioactive and hazardous) waste field which contained numerous heavy metal wastes, including but not limited to mercury, dispersed throughout the soil. The soil samples were treated in 1-kilogram batches using a Kitchen-Aid double planetary mixer with a whisk attachment. The mixing that occurred was at least above 5 of the agitation index described above. A metal reagent was added to each of the soil samples, except sample 1. The metal reagent, in some samples, was treated with an activator, as shown in Table II below. In some soil samples, a wetting agent, elemental sulfur and polysulfides were added to the soil sample. The results of these experiments are shown in Table II.

TABLE II

Mixed Waste Field Demonstration Results

| Mix | Metal | Activator | Sulfur | Dispersing Agent | Polysulfide | TCLP Results (ppb) |
|---|---|---|---|---|---|---|
| 1 | 0 g Zn | 0 g | 250 g | 1.5 g | 85 g | 7,160 |
| 2 | 25 g Zn | 8 g | 250 g | 1.5 g | 85 g | 18.3 |
| 3 | 25 g Zn | 8 g | 250 g | 1.5 g | 150 g | 25.8 |
| 4 | 10 g Zn | 3 g | 250 g | 1.5 g | 85 g | 9.81 |
| 5 | 10 g Zn | 3 g | 250 g | 1.5 g | 85 g | 5.23 |
| 6 | 10 g Zn | 3 g | 0 g | 0 g | 85 g | 8.59 |
| 7 | 12 g Sn | 4 g | 0 g | 0 g | 85 g | 2.11 |

The regulatory limit, or Universal Treatment Standard, for mercury in a material is less than 25 micrograms of leachable mercury in the TCLP solution of the treated waste. It is clear from the above table that the present invention consistently and effectively produced a TCLP lower than the standard. Although the addition of the wetting agent and the elemental sulfur resulted in a reduction of the leachable mercury especially with reference to Tests #4, 5, and 6, the above table shows that an embodiment of the invention does not require the use of either a wetting agent or elemental sulfur, although an alternate embodiment of the invention allows the use of both compounds.

EXAMPLE 2

The presence of other heavy metals in at least one of the soil samples used in Example 1 was analyzed before and after treatment. The results of the analysis are shown in Table III. The present invention also proved effective for stabilizing metals which fall under the Resource and Conservation Recovery Act (RCRA) including, but not limited to: arsenic, barium, cadmium, chromium, lead, selenium, and silver. Table III shows the concentration of metals in the treated and untreated soils, and the applicable regulatory standard, called Universal Treatment Standard (UTS).

TABLE III

RCRA Metal TCLP Results

| RCRA Metal | Untreated Soil (mg Hg/kg) | Treated Soil (mg Hg/kg) | UTS (mg Hg/kg) |
|---|---|---|---|
| Arsenic | 4.25 | <0.02 | 5.0 |
| Barium | 78.4 | 0.825 | 21 |
| Cadmium | 4.08 | <0.003 | 0.11 |
| Chromium | 53.6 | <0.0957 | 0.6 |
| Lead | 131 | 0.131 | 5.7 |
| Selenium | Undetected | <0.03 | 5.7 |
| Silver | 9.66 | <0.004 | 0.1 |

As is evident from the above table, the present invention will bring not only the mercury present in heavily contaminated soils and particulate materials below regulation levels, but the present invention will also bring the RCRA metals that are also usually present in such contaminated soils to below regulation levels as well. It is believed, although the inventors do not wish to held to one theory, that the sulfide bind to the RCRA metals in a similar fashion that the sulfide binds to the mercury to form an insoluble mercury-sulfide. Although tests have not been performed, it is believed that other heavy metals, other than those specifically mentioned herein, can be removed from soils and particulate materials in the same fashion.

The Compositions

Application Composition

The invention also comprises a composition that can be used to stabilize mercury and other heavy metals in the particulate material. The composition comprises a metal reagent, a sulfur-containing compound, and an oxygen-containing compound. The composition can further include an iron-containing compound. The composition can be admixed in order to apply one composition to the particulate material. However, the present invention also contemplates admixing the ingredients in different combinations to allow for more than one application of the ingredients of the composition to the particulate material. For example, the metal reagent and the sulfur-containing compound could be admixed and applied and the oxygen-containing compound and iron-containing compound can be applied separately.

Resultant Composition

The present invention also comprises a composition of the resultant stabilized material 40 that will follow from the implementation of the method of the invention. The resultant composition comprises an amalgamated metal reagent/heavy metal compound mixed with a sulfur-containing material, thus forming an insoluble metal sulfide. The form of the resultant composition can be further modified to produce a desired waste form or to comply with regulations regarding waste forms. If a granular waste form is desired or required, flow enhancing agents can be added. Examples of such flow enhancing agents are vermiculite, sawdust, ground corn cobs, kitty litter, or calcium carbonate, or calcium sulfate. If a monolithic waste form is desired or required, polymeric agents can be added to produce such a waste form. Examples of polymeric agents are epoxy, polymeric resin and melamine formaldehyde.

The Apparatus

The present invention also describes an apparatus that comprises means to apply the metal reagent and the sulfur-containing compound to the particulate material. The apparatus of the present further includes a means for mixing the particulate material, the metal reagent, and the sulfur-containing compound to the particulate material. The mixing means of the apparatus of the present invention can include any apparatus that will allow particulate material to be admixed with other compounds. This can include, but is not limited to, mixers, agitators, kneaders, blenders, grinders, ball mills, tumbling mills, crushers and disintegrators. Alternate embodiments of include a number of different applicators for applying the various ingredients of the composition of the present invention or a collector for collecting the particulate material into a mixing vessel to be treated and mixed. The apparatus of the present invention can also comprise means for impregnating the particulate material with oxygen including but not limited to a sparge or a nozzle and pump system. It should be understood that the invention also contemplates an apparatus that can be used either in a laboratory or in a quasi in situ setting. In a laboratory setting, the apparatus would comprise an applicator which could apply the metal reagent and/or the sulfur-containing compound to the particulate materials and a mixer. In one embodiment of the invention, there are more than one applicator, one for each of the various compounds that will be added to the particulate material. However, the present invention clearly contemplates adding all but the iron containing compound simultaneously. In another embodiment of the invention, a sparge line for incorporating oxygen into the particulate material is also contemplated.

In a quasi in situ setting, one embodiment includes a moveable platform, in some instances, remote-controlled, that has a collector for collecting the particulate material into a mixer and an applicator to allow the metal reagent and sulfur-containing compound to be applied to and mixed with the soil. In another embodiment of the invention, the moveable platform has an auger and an applicator such that the metal reagent and sulfur-containing compound can be applied to the particulate material such that the auger will mix the particulate material and distribute the metal reagent and sulfur-containing compound throughout the particulate material.

The principles, embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

We claim:

1. A method for stabilizing metals an a particulate material comprising the steps of:
    (a) contacting a metal reagent with the particulate material, said particulate material having a solids content of greater than about seventy-five weight percent;
    (b) contacting a sulfur-containing compound with the particulate material; and
    (c) agitating the particulate material to entrain oxygen in the particulate material, wherein the metal reagent is selected from the group consisting of metal based elements from Group 1B, Group 2B, Group 4B, Group 4A and combinations thereof of the Periodic Table of Elements.

2. A method according to claim 1 wherein the metals in the particulate material that are to be stabilized are selected from the group consisting of mercury, arsenic, lead, zinc, barium, cadmium, chromium, selenium, silver and mixtures thereof.

3. A method according to claim 1 wherein the particulate material has a mercury content of greater than about 260 ppm.

4. A method according to claim 1 wherein the particulate material is soil and further comprising the additional step of adding a dispersing agent to the soil.

5. A method according to claim 1 comprising the additional step of treating the metal reagent with an activator.

6. A method according to claim 1 comprising the additional step of adding an iron-containing compound to the particulate material to react with excess sulfides in the particulate material.

7. A method according to claim 1 wherein the sulfur-containing compound is a dimethylthiolcarbamate, diethylthiolcarbamate, sulfide, polysulfide or mixtures thereof.

8. A method according to claim 1 wherein the metal reagent is selected from the group consisting of zinc, tin, copper, titanium, lead and mixtures thereof.

9. A method according to claim 1 wherein the metal reagent is tin.

10. A method according to claim 5 wherein the activator is a mineral containing acid.

11. A method according to claim 5 wherein the activator is a sulfur-containing acid.

12. A method according to claim 5 wherein the activator is selected from the group consisting of sulfamic acid, sulfamidic acid, sulfonic acid, sulfinic acid, sulfenic acid, and mixtures thereof.

13. A method according to claim 5 wherein the activator is sulfamic acid.

14. A method according to claim 6 wherein a pH level of the particulate material is in a range of approximately pH 4 to pH 8.

15. A method according to claim 14 wherein the pH level of the particulate material is raised following the addition of the sulfur-containing compound.

16. A method according to claim 15 wherein the pH level of the particulate material is approximately neutral following the addition of the iron-containing compound.

17. A method according to claim 1 wherein approximately 0.4 to 2.0 weight percent of the metal reagent is added per kilogram of particulate material.

18. A method according to claim 1 wherein the sulfur-containing compound is added in an amount ranging from about 1.0 mole to about 2.0 mole of sulfur-containing compound per mole of mercury for a metals concentration in the range of about 300 ppm of metals to about 1000 ppm of metals.

19. A method according to claim 1 wherein the sulfur-containing compound is added in the an amount ranging from about 2.0 mole to about 3.0 mole of sulfur-containing compound per mole of mercury for a metals concentration in the range of about 1000 ppm of metals to about 3000 ppm of metals.

20. A method according to claim 1 wherein the particulate material is selected from the group consisting of soil, sand, dirt, sludge, solid wastes and mixtures thereof.

21. A method according to claim 6 wherein the iron-containing compound is selected from the group consisting of elemental iron, ferric chloride, ferric sulfate, ferrous sulfate and mixtures thereof.

22. A method according to claim 4 wherein the dispersing agent is a surfactant.

23. A method according to claim 4 wherein the dispersing agent is a detergent.

24. A method for stabilizing metals in a particulate material comprising the steps of:
   a) treating a metal reagent with an activator;
   b) adding a dispersing agent to the particulate material;
   c) adding a metal reagent to the particulate material, said particulate material having a solids content of greater than about seventy-five weight percent;
   d) adding a sulfur-containing compound to the particulate material;
   e) agitating the particulate material to entrain oxygen in the particulate material;
   f) adding an iron-containing compound to the particulate material to react with excess sulfides in the particulate material.

25. A method according to claim 24 wherein the metals in the particulate material that are to be stabilized are selected from the group consisting of mercury, arsenic, lead, zinc, barium, cadmium, chromium, selenium, silver and mixtures thereof.

26. A method according to claim 24 wherein the particulate material has a mercury content of greater than about 260 ppm.

27. A method according to claim 24 wherein the sulfur-containing compound is calcium sulfate, dithiolcarbomate, dimethylcarbomate, sulfide, polysulfide or and mixtures thereof.

28. A method according to claim 24 wherein the metal reagent is selected from the group consisting of metal based elements from Group 1B, Group 2B, Group 4B, Group 4A and combinations thereof of the Periodic Table of Elements.

29. A method according to claim 24 wherein the metal reagent is selected from the group consisting of zinc, tin, copper, titanium, lead and mixtures thereof.

30. A method according to claim 24 wherein the metal reagent is tin.

31. A method according to claim 24 wherein the activator is a mineral containing acid.

32. A method according to claim 24 wherein the activator is a sulfur-containing acid.

33. A method according to claim 24 wherein the activator is selected from the group consisting of sulfamic acid, sulfamidic acid, sulfonic acid, sulfinic acid, sulfenic acid and mixtures thereof.

34. A method according to claim 24 wherein the activator is sulfamic acid.

35. A method according to claim 24 wherein a pH level of the particulate material is in a range of approximately pH 4 to pH 8.

36. A method according to claim 35 wherein the pH level of the particulate material is raised following the addition of the sulfur-containing compound.

37. A method according to claim 36 wherein the pH level of the particulate material is approximately neutral following the addition of the iron-containing compound.

38. A method according to claim 24 wherein approximately 0.4 to 2.0 weight percent of the metal reagent is added per kilogram of particulate material.

39. A method according to claim 24 wherein the sulfur-containing compound is added in an amount ranging from about 1.0 mole to about 2.0 mole of sulfur-containing compound per mole of mercury for a metals concentration in the range of about 300 ppm of metals to about 1000 ppm of metals.

40. A method according to claim 24 wherein the sulfur-containing compound is added in the an amount ranging from about 2.0 mole to about 3.0 mol of sulfur-containing compound per mole of mercury for a metals concentration in the range of about 1000 ppm of metals to about 5000 ppm of metals.

41. A method according to claim 24 wherein the particulate material is selected from the group consisting of soil, sand, dirt, sludge, solid wastes and mixtures thereof.

42. A method according to claim 24 wherein the iron-containing compound is selected from the group consisting of elemental iron, ferric sulfate, ferric chloride, ferrous sulfate and mixtures thereof.

43. A method according to claim 24 wherein the dispersing agent is a surfactant.

44. A method according to claim 24 wherein the dispersing agent is a detergent.

45. A method for stabilizing metals in a particulate compound comprising the steps of:
   (a) adding a metal reagent to the particulate material, said particulate material having a solids content of greater than about seventy-five weight percent;

(b) adding a sulfur-containing compound to the particulate material;

(c) impregnating the particulate material with oxygen;

(d) agitating the particulate material to entrain oxygen in the particulate material; and, (e) adding an iron-containing compound to the particulate to remove excess sulfides from the particulate material.

46. A method for stabilizing metals in a particulate compound comprising the steps of:

(a) adding a metal reagent to the particulate material, said particulate material having a solid content of greater than about seventy-five weight percent;

(b) adding a sulfur-containing compound to the particulate material;

(c) agitating the particulate material to entrain oxygen in the particulate material; and, (d) adding an iron-containing compound to the particulate to remove excess sulfides from the particulate material.

47. A method for stabilizing metals in a particulate material comprising the steps of:

(a) adding a dispersing agent to the particulate material;

(b) adding a metal reagent to the particulate material, said particulate material having a solids content of greater than about seventy-five weight percent;

(c) adding a sulfur-containing compound to the particulate material;

(d) agitating the particulate material to entrain oxygen in the particulate material; and, (e) adding an iron-containing compound to the particulate material to remove excess sulfides from the particulate material.

48. A method for stabilizing metals in a particulate material comprising the steps of:

(a) adding a metal reagent to the particulate material, said particulate material having a solids content of greater than about seventy-five weight percent;

(b) adding a sulfur-containing compound to the particulate material; and, (c) impregnating the particulate material with oxygen, wherein the metal reagent is selected from the group consisting of metal based elements from Group 1B, Group 2B, Group 4B, Group 4A and combinations thereof of Periodic Table of Elements.

49. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material;

(c) agitating the particulate material to entrain oxygen in the particulate material; and (d) adding an iron-containing compound to the particulate material to react with excess sulfides in the particulate material.

50. A method according to claim 49 wherein a pH level of the particulate material is in a range of approximately pH 4 to pH 8.

51. A method according to claim 50 wherein the pH level of the particulate material is raised following the addition of the sulfur-containing compound.

52. A method according to claim 49 wherein the pH level of the particulate material is approximately neutral following the addition of the iron-containing compound.

53. A method according to claim 49 wherein the iron-containing compound is selected from the group consisting of elemental iron, ferric chloride, ferric sulfate, ferrous sulfate and mixtures thereof.

54. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material; and (c) agitating the particulate material to entrain oxygen in the particulate material, wherein the metal reagent is selected from the group consisting of zinc, tin, copper, titanium, lead and mixtures thereof.

55. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material; and (c) agitating the particulate material to entrain oxygen in the particulate material, wherein the metal reagent is tin.

56. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material;

(c) agitating the particulate material to entrain oxygen in the particulate material; and (d) treating the metal reagent with an activator, wherein the activator is selected from the group consisting of sulfamic acid, sulfamidic acid, sulfonic acid, sulfinic acid, sulfenic acid, and mixtures thereof.

57. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material;

(c) agitating the particulate material to entrain oxygen in the particulate material; and (d) treating the metal reagent with an activator, wherein the activator is sulfamic acid.

58. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material;

(c) agitating the particulate material to entrain oxygen in the particulate material, wherein the particulate material is soil; and (d) adding a dispersing agent to the soil wherein the dispersing agent is a surfactant.

59. A method for stabilizing metals in a particulate material comprising the steps of:

(a) contacting a metal reagent with the particulate material, said particulate material having a solids content of greater than about seventy-five weight percent;

(b) contacting a sulfur-containing compound with the particulate material;

(c) agitating the particulate material to entrain oxygen in the particulate material, wherein the particulate material is soil; and (d) adding a dispersing agent to the soil, wherein the dispersing agent is a detergent.

60. A method according to claim 48 wherein the particulate material is impregnated with oxygen by adding an oxygen-containing compound to the particulate material.

61. A method according to claim 48 wherein the metals in the particulate material that are to be stabilized are selected from the group consisting of mercury, arsenic, lead, zinc, barium, cadmium, chromium, selenium, silver and mixtures thereof.

62. A method according to claim 48 wherein the particulate material has a mercury content of greater than about 260 ppm.

63. A method according to claim 48 wherein the particulate material is soil and further comprising the additional step of adding a dispersing agent to the soil.

64. A method according to claim 48 comprising the additional step of treating the metal reagent with an activator.

65. A method according to claim 48, comprising the additional step of adding an iron-containing compound to the particulate material to react with excess sulfides in the particulate material.

66. A method according to claim 48 wherein the sulfur-containing compound is a dimethylthiolcarbamate, diethylthiolcarbamate, sulfide, polysulfide or mixtures thereof.

67. A method according to claim 48 wherein the metal reagent is selected from the group consisting of zinc, tin, copper, titanium, lead and mixtures thereof.

68. A method according to claim 48 wherein the metal reagent is tin.

69. A method according to claim 64 wherein the activator is a mineral containing acid.

70. A method according to claim 64 wherein the activator is a sulfur-containing acid.

71. A method according to claim 64 wherein the activator is selected from the group consisting of sulfamic acid, sulfamidic acid, sulfonic acid, sulfinic acid, sulfenic acid, and mixtures thereof.

72. A method according to claim 64 wherein the activator is sulfamic acid.

73. A method according to claim 48 wherein a pH level of the particulate material is in a range of approximately pH 4 to pH 8.

74. A method according to claim 73 wherein the pH level of the particulate material is raised following the addition of the sulfur-containing compound.

75. A method according to claim 65 wherein the pH level of the particulate material is approximately neutral following the addition of the iron-containing compound.

76. A method according to claim 48 wherein approximately 0.4 to 2.0 weight percent of the metal reagent is added per kilogram of particulate material.

77. A method according to claim 48 wherein the sulfur-containing compound is added in an amount ranging from about 1.0 mole to about 2.0 mole of sulfur-containing compound per mole of mercury for a metals concentration in the range of about 300 ppm of metals to about 1000 ppm of metals.

78. A method according to claim 48 wherein the sulfur-containing compound is added in the an amount ranging from about 2.0 mole to about 3.0 mole of sulfur-containing compound per mole of mercury for a metals concentration in the range of about 1000 ppm of metals to about 3000 ppm of metals.

79. A method according to claim 48 wherein the particulate material is selected from the group consisting of soil, sand, dirt, sludge, solid wastes and mixtures thereof.

80. A method according to claim 65 wherein the iron-containing compound is selected from the group consisting of elemental iron, ferric chloride, ferric sulfate, ferrous sulfate and mixtures thereof.

81. A method according to claim 63 wherein the dispersing agent is a surfactant.

82. A method according to claim 63 wherein the dispersing agent is a detergent.

* * * * *